US007272987B2

(12) United States Patent
Hughes

(10) Patent No.: US 7,272,987 B2
(45) Date of Patent: Sep. 25, 2007

(54) HYBRID POWERTRAIN SYSTEM

(75) Inventor: Douglas A. Hughes, Wixom, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/235,490

(22) Filed: Sep. 26, 2005

(65) Prior Publication Data
US 2006/0021456 A1 Feb. 2, 2006

Related U.S. Application Data

(63) Continuation of application No. 10/747,993, filed on Dec. 30, 2003, now Pat. No. 7,082,850.

(51) Int. Cl.
F16H 3/38 (2006.01)
F16H 3/08 (2006.01)
B60W 10/02 (2006.01)

(52) U.S. Cl. ................... 74/340; 74/330; 477/5
(58) Field of Classification Search ........... 74/329, 74/340, 330; 477/3, 5; 475/5; 180/65.2–65.4
See application file for complete search history.

(56) References Cited

U.S. PATENT DOCUMENTS

| 5,558,595 | A | 9/1996 | Schmidt et al. |
| 5,637,987 | A | 6/1997 | Fattic et al. |
| 5,713,814 | A | 2/1998 | Hara et al. |
| 6,176,808 | B1 | 1/2001 | Brown et al. |
| 6,371,878 | B1 | 4/2002 | Bowen |
| 6,380,640 | B1 | 4/2002 | Kanamori et al. |
| 6,427,547 | B1 | 8/2002 | Bowen |
| 6,490,945 | B2 | 12/2002 | Bowen |
| 6,595,077 | B1 * | 7/2003 | Geiberger et al. ............ 74/330 |
| 6,634,247 | B2 | 10/2003 | Pels et al. |
| 6,675,668 | B2 | 1/2004 | Schamscha |
| 6,712,734 | B1 * | 3/2004 | Loeffler ......................... 477/5 |
| 6,883,394 | B2 * | 4/2005 | Koenig et al. ................ 74/335 |
| 7,082,850 | B2 * | 8/2006 | Hughes ....................... 74/329 |
| 2002/0033059 | A1 | 3/2002 | Pels et al. |
| 2002/0088288 | A1 * | 7/2002 | Bowen ......................... 74/331 |

(Continued)

FOREIGN PATENT DOCUMENTS

DE 35 46 454 A1 2/1987

(Continued)

OTHER PUBLICATIONS

International Search Report dated Apr. 28, 2005 (3 pages).

(Continued)

Primary Examiner—Roger Pang
(74) Attorney, Agent, or Firm—Rader, Fishman & Grauer PLLC

(57) ABSTRACT

A powertrain system is provided that includes a first prime mover and change-gear transmission having a first input shaft and a second input shaft. A twin clutch is disposed between the first prime mover and the transmission. The twin clutch includes a first main clutch positioned between the first prime mover and the first input shaft and a second main clutch positioned between the first prime mover and the second input shaft. The powertrain system also includes a second prime mover operably connected to one of the first and second input shafts.

32 Claims, 2 Drawing Sheets

U.S. PATENT DOCUMENTS

| | | |
|---|---|---|
| 2002/0088291 A1 | 7/2002 | Bowen |
| 2002/0092372 A1* | 7/2002 | Bowen .................... 74/339 |
| 2002/0177504 A1 | 11/2002 | Pels et al. |
| 2004/0025618 A1 | 2/2004 | Thery |
| 2004/0166990 A1 | 8/2004 | Buchanan et al. |

FOREIGN PATENT DOCUMENTS

| | | |
|---|---|---|
| DE | 100 52 393 A1 | 5/2002 |
| EP | 0 845 618 A2 | 6/1998 |
| FR | 2 811 395 A1 | 1/2002 |

OTHER PUBLICATIONS

Delphion English Abstract for DE 35 46 454 (3 pages).
Derwent English Abstract for DE 100 52 393 (1 page).
Delphion English Abstract for EP 0 845 618 (2 pages).
Derwent English Abstract for FR 2 811 395 (1 page).
7th Luk Symposium Apr. 11-12, 2002—Publication entitled "Gearing Up for Tomorrow, Take a Luk Inside . . . ."

* cited by examiner

HYBRID POWERTRAIN SYSTEM

This application is a continuation of U.S. application Ser. No. 10/747,993, filed on Dec. 30, 2003 now U.S. Pat. No. 7,082,850, the contents of which are incorporated herein.

This Invention was made with Government support under NREL Subcontract No. ZCL-2-32060-01, Prime Contract DE-AC36-99GO10337 awarded by the Department of Energy. The government has certain rights in this Invention.

BACKGROUND OF THE INVENTION

1. Field of the Invention

The present invention relates generally to a vehicle powertrain system and, more particularly, to a hybrid powertrain system employing at least two prime movers and a twin clutch transmission.

2. Description of the Related Art

Various types of twin clutch transmissions have been proposed and put into practical use, particularly in the field of wheeled motor vehicles. Traditional twin clutch transmissions are of a type in which gears are parted into two groups, each group having an individual main clutch, so that the operative condition of each group of gears is carried out by selectively engaging a corresponding main clutch. Twin clutch transmissions are used in vehicles to improve the transition from one gear ratio to another and, in doing so, improve the efficiency of the transmission.

Hybrid vehicle powertrain systems employing two or more prime movers are also known in the art. A typical hybrid powertrain system includes an internal combustion engine that is strategically operated in combination with an electric motor to provide driving torque to the wheels of a vehicle. Among other features, hybrid powertrain systems improve vehicle fuel economy by allowing a reduction in the displacement of the internal combustion engine and by recapturing and using kinetic energy lost during vehicle braking in a conventional powertrain system.

SUMMARY OF THE INVENTION

The present invention is an improved vehicle powertrain system that utilizes one or more features of a twin clutch transmission and a dual prime mover hybrid powertrain arrangement. In an embodiment of the invention, a powertrain system is provided that includes a first prime mover and change-gear transmission having a first input shaft and a second input shaft. A twin clutch is disposed between the first prime mover and the transmission. The twin clutch includes a first main clutch positioned between the first prime mover and the first input shaft and a second main clutch positioned between the first prime mover and the second input shaft. The powertrain system also includes a second prime mover operably connected to one of the first and second input shafts. A transmission and twin clutch arrangement for a dual prime mover powertrain system is also provided.

BRIEF DESCRIPTION OF THE DRAWINGS

Embodiments of the invention will now be described, by way of example, with reference to the accompanying drawings, wherein.

DETAILED DESCRIPTION OF THE INVENTION

Figure 1:
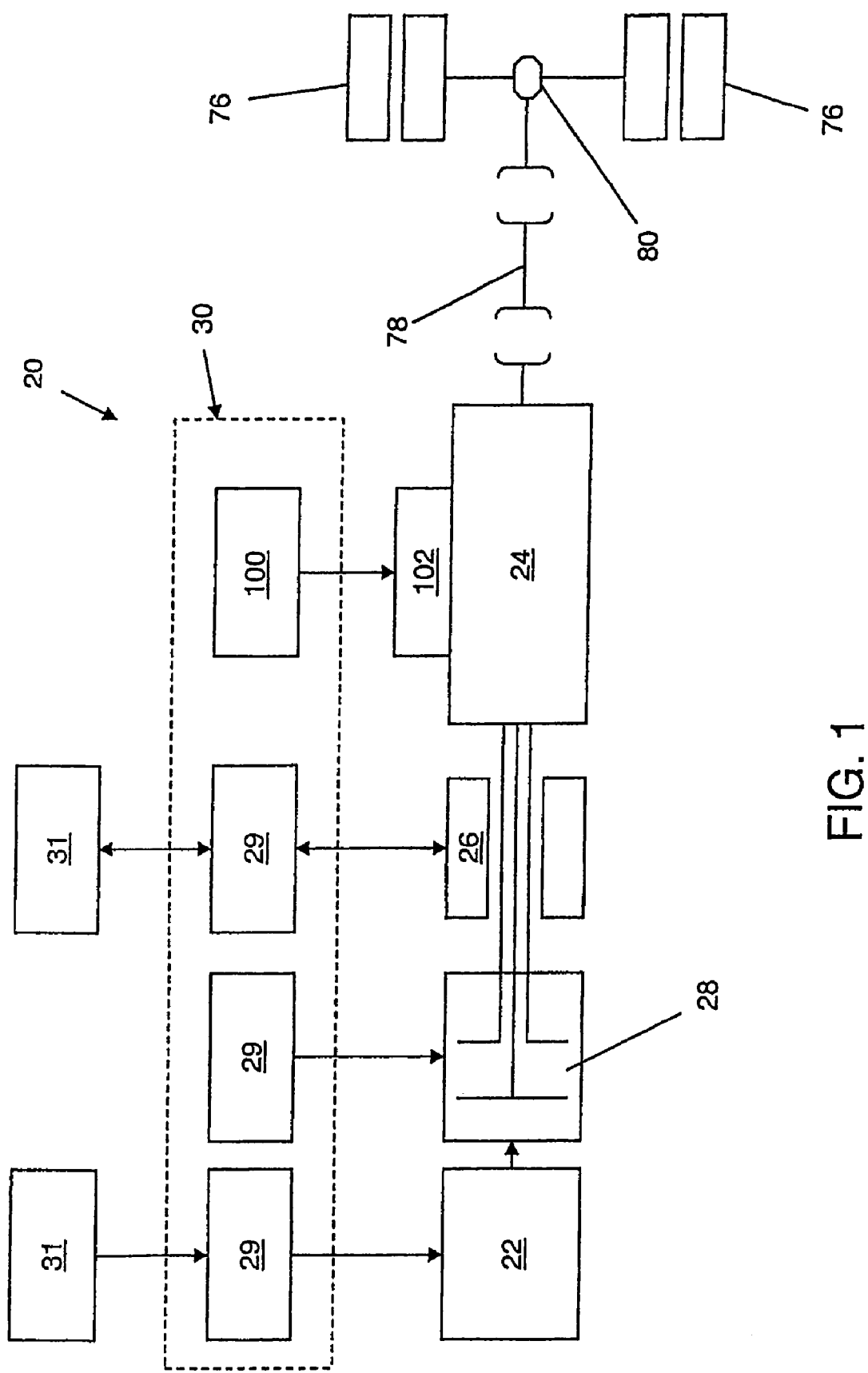
FIG. 1 is a diagrammatic representation of a powertrain system according to an embodiment of the present invention.

Referring to FIG. 1, a hybrid powertrain system 20 is shown in accordance with an embodiment of the present invention. In the illustrated embodiment, powertrain system 20 includes a first prime mover 22, such as a spark-ignited or compression-ignited internal combustion engine, a transmission 24 and a second prime mover 26, such as an electric motor/generator or hydraulic motor/pump. A main clutch assembly 28 is positioned between first prime mover 22 and transmission 24 to selectively engage/disengage first prime mover 22 from transmission 24.

In an embodiment, powertrain system 20 also includes an electronic control unit (ECU) 30 for controlling operation of first prime mover 22, main clutch assembly 28, second prime mover 26 and transmission 24. In an implementation of the invention, ECU 30 includes a programmable digital computer that is configured to receive various input signals, including without limitation, the operating speeds of first and second prime movers 22 and 26, transmission input speed, selected transmission ratio, transmission output speed and vehicle speed, and processes these signals accordingly to logic rules to control operation of powertrain system 20. For example, ECU 30 may be programmed to deliver fuel to first prime mover 22 when first prime mover 22 functions as an internal combustion engine. To support this control, each of first prime mover 22, second prime mover 26 and main clutch assembly 28 may include its own control system 29 contained within ECU 30. However, it will be appreciated that the present invention is not limited to any particular type or configuration of ECU 30, or to any specific control logic for governing operation of powertrain system 20.

In an embodiment of the invention, powertrain system 20 also includes at least one energy storage device 31 for providing energy to operate first and second prime movers 22, 26. For example, energy storage device 31 may contain a hydrocarbon fuel when first prime mover functions as an internal combustion engine. In another example, energy storage device 31 may include a battery, a bank of batteries or a capacitor when second prime mover 26 functions as an electric motor/generator. Alternatively, energy storage device 31 may function as a hydraulic accumulator when second prime mover 26 functions as a hydraulic motor/pump. While ECU 30 provides first and second prime movers 22, 26 in communication with energy storage device (s) 31 when operation of first and second prime movers 22, 26 is desired, the energy is not necessarily routed through ECU 30 as shown in FIG. 1.

Figure 2:
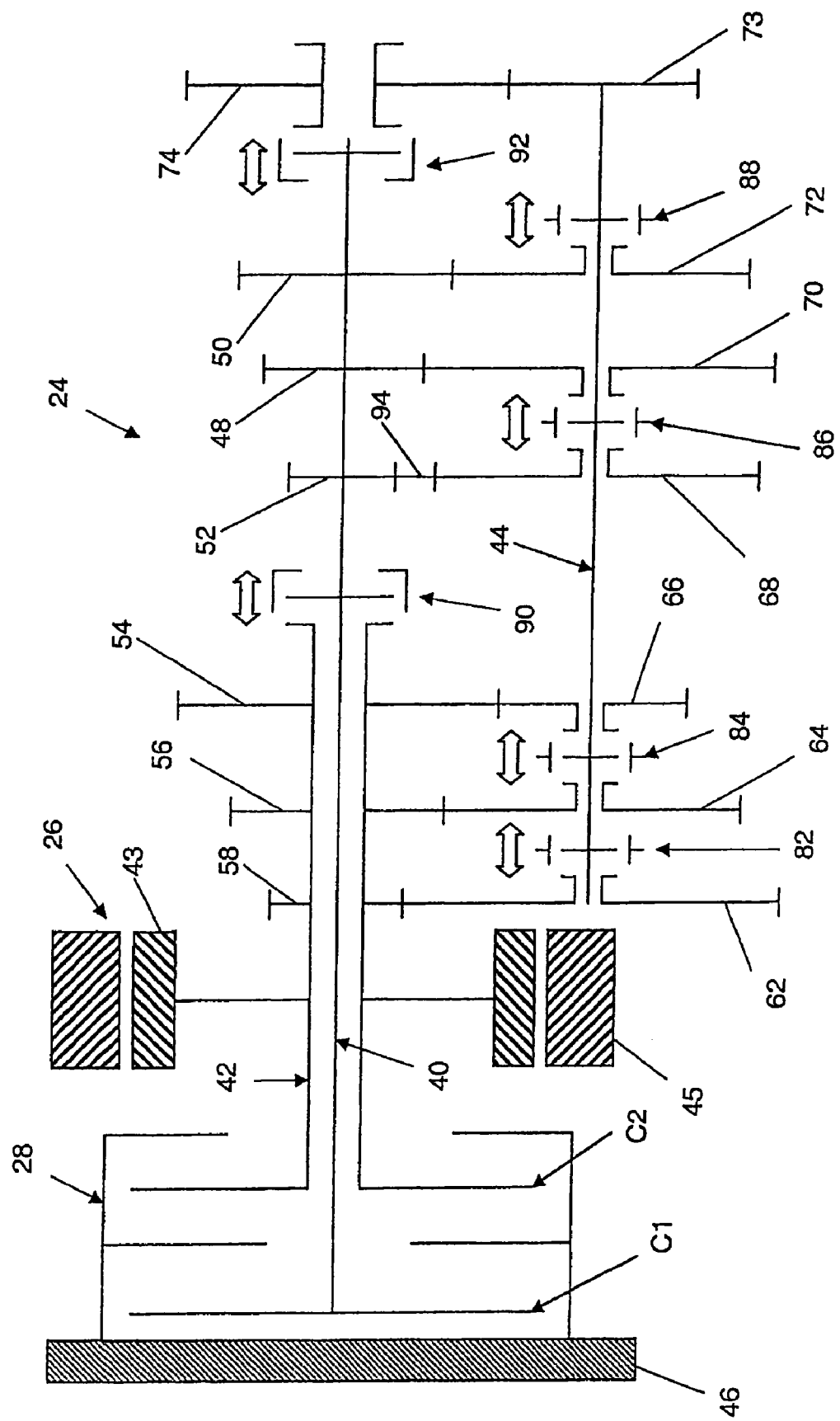
FIG. 2 is a schematic illustration of a transmission and twin clutch arrangement according to an embodiment of the present invention.

Referring to FIG. 2, an embodiment of a transmission and clutch arrangement for use in a dual prime mover powertrain system is shown. In the illustrated embodiment, transmission 24 includes a first input shaft 40, a hollow second input shaft 42, which is coaxially disposed about the first input shaft 40 to achieve a relative rotation therebetween, a countershaft 44 that extends substantially parallel with first and second input shafts 40 and 42, and a plurality of gears which are arranged on and/or around shafts 40, 42 and 44. Although shafts 40, 42 and 44 are illustrated as being mounted in a common plane in FIG. 2, these shafts may be arranged in different planes.

When second prime mover 26 functions as a motor/generator, as illustrated in FIG. 2, second input shaft 42 is operably connected for rotation with a rotor 43 that is positioned within a stator 45, as is known in the art. In a particular implementation, rotor 43 is splined to second input shaft 42 for rotation therewith; however, other configurations known in the art may also be used to connect second input shaft 42 for rotation with rotor 43. As noted above, operation of second prime mover 26 is not limited to that of an electric motor/generator. For example, second prime mover 26 may function as a hydraulic motor/pump.

In the embodiment shown in FIG. 2, first input shaft 40 is connectable to an output portion 46 of first prime mover 22, such as a flywheel, through a first main clutch C1 that is used to establish even speed gearing (viz., second speed gearing, fourth speed gearing and reverse gearing), while second input shaft 42 is connectable to flywheel 46 through a second main clutch C2 that is used for establishing odd speed gearing (viz., first speed gearing, third speed gearing and fifth speed gearing). In an embodiment of the invention, first and second main clutches C1 and C2 are of a normally ON type, which assumes the ON (viz., engaged) state due to a biasing force of a spring and the like under a normal condition and establishes the OFF (viz., disengaged) state due to work of a hydraulic or electric actuator upon receiving a given instruction. Engagement and disengagement of first and second main clutches C1, C2 may function automatically under the control of ECU 30, and without intervention of a vehicle driver, when powertrain systems operates like an "automatic" transmission.

To first input shaft 40 there are connected a 2nd speed input gear 48, a 4th speed input gear 50 and a reverse input gear 52, such that gears 48, 50 and 52 rotate together with first input shaft 40. Similarly, to second input shaft 42 there are connected a 5th speed input gear 54, a 3rd speed input gear 56 and a 1st speed input gear 58, such that gears 54, 56 and 58 rotate together with second input shaft 42. The number of input gears provided on first and second input shafts is not limited to the number shown in FIG. 2, and may include more or less input gears depending on the number of ratios desired in the transmission. The term "gear," as stated herein, is used to define the toothed wheels illustrated in FIG. 2, as well as manufacturing the toothed features of the wheels directly into first and second input shafts 40, 42 and countershaft 44.

To countershaft 44 there are rotatably connected a 1st speed output gear 62, a 3rd speed output gear 64, a 5th speed output gear 66, a reverse output gear 68, a 2nd speed output gear 70 and a 4th speed output gear 72. Thus, output gears 62-72 rotate around countershaft 46. Like input gears 48-58, the number of output gears provided on countershaft 46 is not limited to the number shown in FIG. 2.

Referring still to FIG. 2, 1st speed output gear 62, 3rd speed output gear 64 and 5th speed output gear 66 are meshed with 1st speed input gear 58, 3rd speed input gear 56 and 5th speed input gear 54, respectively. Similarly, reverse output gear 68, 2nd speed output gear 70, and 4th speed output gear 72 are meshed with reverse input gear 52 (through idler 94), 2nd speed input gear 48, and 4th speed input gear 50, respectively. In another embodiment, transmission 24 may include a second countershaft (not shown) that includes one or more of the output gears rotatably disposed on first countershaft 44.

To countershaft 44 there is also integrally connected a final drive pinion gear 73 that rotates together with countershaft 44. Final drive pinion 73 is arranged perpendicular to an axis of a rotational output member 74, such as a final drive ring gear, and is meshed with output member 74. In the embodiment shown in FIG. 1, a transmission output rotation from drive pinion 73 to output member 74 is distributed to wheels 76 through a drive shaft 78 and a differential 80.

Referring again to FIG. 2, transmission 24 also includes axially moveable clutches 82, 84, 86 and 88, such as synchronized single or double acting dog-type clutches, which are splined to countershaft 44 for rotation therewith. Clutch 82 is moveable by a conventional shift fork (not shown) in an axial direction toward main clutch assembly 28 to fix countershaft 44 for rotation with 1st speed output gear 62. Similarly, clutch 84 may be moved in opposite axial directions to rotationally fix output gear 64 or output gear 66 to countershaft 44. Clutch 86 may be selectively moved in opposite axial directions to rotationally fix output gear 68 or output gear 70 to countershaft 44. Clutch 88 may be moved in an axial direction toward main clutch assembly 28 to fix countershaft 44 for rotation with output gear 72. In another embodiment of the invention, clutches 82, 84, 86 and 88 may also be provided on first and second input shafts 40, 42 to engage and disengage gears rotatably supported on input shafts 40, 42 in a manner substantially similar to the manner in which the gears are engaged on countershaft 44.

In an embodiment of the invention, transmission 24 also includes axially moveable input shaft clutches 90 and 92, such as synchronized single acting dog-type clutches, which are splined to first input shaft 40 for rotation therewith. In the illustrated embodiment, clutch 90 may be moved in an axial direction toward main clutch assembly 28 to fix first input shaft 40 for rotation with second input shaft 42. Similarly, clutch 92 may be moved in an axial direction away from main clutch assembly 28 to fix first input shaft 40 for rotation with output member 74.

As described above, ECU 30 delivers commands to the components of powertrain system 20 based on the receipt and evaluation of various input signals. These commands may include gear ratio interchange commands to a shift control device that indirectly moves clutches 82, 84, 86, 88, 90 and 92 to establish the gear ratios between first and second input shafts 40, 42 and countershaft 44. The shift control device may be a conventional device, such as, for example, an X-Y electromechanical shift actuator system 100 (FIG. 1), or any other suitable device that controls the axial position of each of clutches 82, 84, 86, 88, 90 and 92 through a rail-type shift control mechanism 102 (FIG. 1). Alternatively, clutches 82, 84, 86, 88, 90 and 92 may be hydraulically and/or electromechanically operated without the use of a rail-type shift control mechanism 102.

Operation of hybrid powertrain system 20 will now be described with reference to FIG. 2. In a first mode of operation employed during vehicle launch and acceleration, first and second main clutches C1 and C2 are initially disengaged and clutch 82 is moved leftward from the neutral position shown in FIG. 2, so that 1st speed output gear 62 is fixed to countershaft 44 by clutch 82. Upon this movement, power from first prime mover 22 may be transmitted to countershaft 44 by engaging second main clutch C2. The power applied to second input shaft 42 is transmitted through 1st speed input gear 58 to countershaft 44 through 1st speed output gear 62, and then to final drive pinion 73 so that a first speed ratio is established in transmission 24.

As the vehicle accelerates and the second speed ratio is desired, clutch 86 is moved rightward from the neutral position shown in FIG. 2, so that 2nd speed output gear 70 is fixed to countershaft 44 by clutch 86. The engagement of clutch 86 occurs while first main clutch C1 is disengaged and no power is being transmitted from first prime mover 22 to first input shaft 40. Once clutch 86 is engaged, the currently engaged second main clutch C2 is disengaged while simultaneously or nearly simultaneously engaging first main clutch C1. The resulting power applied to first input shaft 40 is transmitted through 2nd speed input gear 48 to countershaft 44 through 2nd speed output gear 70, and then to final drive pinion 73 so that a second speed ratio is established in transmission 24. This process is repeated in the same manner for up-shifting through the remaining gear ratios, and in a reverse manner for down-shifting from one gear ratio to another.

To achieve the reverse gear in transmission 24, first and second main clutches C1 and C2 are disengaged and clutch 86 is moved leftward from the neutral position shown in FIG. 2, so that reverse output gear 68 is fixed to countershaft 44 by clutch 86. The power applied to first input shaft 40 is transmitted from reverse input gear 52 to countershaft 44 through an idler gear 94 and reverse output gear 68, and then to final drive pinion 73.

Under a normal operating state, wherein transmission 24 assumes a certain speed gearing, both first and second main clutches C1 and C2 may be kept in their engaged conditions while one of clutches 82, 84, 86, and 88 is kept at a given power transmitting position. For example, when transmission 24 assumes the 5th speed ratio, both first and second main clutches C1 and C2 may be engaged while clutch 84 is engaged with 5th speed output gear 66 and clutches 82, 86 and 88 are in their neutral position shown in FIG. 2. Although first and second main clutches are engaged, no power is transmitted through the unselected output gears 62, 64, 68, 70 and 72 because the output gears are free to rotate on countershaft 44 when not engaged by a corresponding clutch 82, 86 or 88.

Using main clutch 28, a vehicle employing hybrid powertrain system 20 may be launched in a traditional manner under the power of first prime mover 22 or a combination of first and second prime movers 22, 26. Alternatively, a vehicle employing powertrain system 20 may be launched solely under the power of second prime mover 26. In this manner, first and second master clutches C1 and C2 are disengaged and second prime mover 26 is operated to drive rotation of second input shaft 42.

In the embodiment shown in FIG. 2, gears 58 and 62 establish a "low" gear ratio between second input shaft 42 and countershaft 44 when clutch 82 fixes gear 62 for rotation with countershaft 44. Because a vehicle employing powertrain system 20 may be launched from rest solely under the power of second prime mover 26, this "low" gear ratio provides the highest torque output for a given torque input from second prime mover 26, which will permit launching and initial acceleration of the vehicle. This ratio also provides the highest rotational speed for second input shaft 42, which, when back-driven from the vehicle wheels, can be used to quickly recharge energy storage device 31 during regenerative braking of the vehicle as discussed in greater detail below. Gears 54 and 66 establish a "high" gear ratio between second input shaft 42 and countershaft 44 when clutch 84 fixes gear 66 for rotation with countershaft 44.

When first prime mover 22 functions as an engine, the engine may be started prior to launching the vehicle using second prime mover 26 as the "starter". In an embodiment, the engine may be started by engaging clutch C2 to fix second input shaft 42 for rotation with flywheel 46, and then operating second prime mover 26 to apply power to second input shaft 42 to drive rotation of flywheel 46. Alternatively, the engine can be started after the vehicle is launched and traveled some distance solely under the power of second prime mover 26. For example, with clutches C1 and C2 initially disengaged and second prime mover 26 driving rotation of countershaft 44 through gears 58 and 62, input shaft clutch 90 can be engaged to fix first input shaft 40 for rotation with second input shaft 42. Then, with second prime mover 26 driving rotation of both first and second input shafts 40, 42, first main clutch C1 may be engaged to drive rotation of flywheel 46 and start the engine. Alternatively, second main clutch C2 may be engaged to drive rotation of flywheel 46 without engaging input shaft clutch 90.

Once launched, the vehicle can be driven forward under the power of first prime mover 22, second prime mover 26 or a combination of both. For example, when a combination of power from first and second prime movers 22, 26 is desired to drive countershaft 44 through one of gears 62, 64 or 66, clutch C2 is engaged and power is applied directly to input shaft 42 by both of first and second prime movers 22, 26. Alternatively, clutch C1 may be engaged and power applied indirectly to input shaft 42 through clutch 90. In another example, when a combination of power from first and second prime movers 22, 26 is desired to drive countershaft 44 through one of gears 68, 70 and 72, either one of first and second main clutches C1 and C2 is disengaged, input shaft clutch 90 is engaged and power is applied directly to input shaft 40 by first prime mover 22 (or indirectly through second input shaft 42) and indirectly by second prime mover 26 through second input shaft 42. In still another example, clutch C1 may be engaged, clutch C2 may be disengaged and power may be applied by second prime mover 26 through second input shaft 42 and by first prime mover 22 through first input shaft 40. The power applied to first input shaft 40 is then transmitted to countershaft 44 by operating clutch 86 or 88. Similarly, the power applied to second input shaft 42 is transmitted to countershaft 44 by operating clutch 82 or 84.

As will be appreciated, first input shaft clutch 90 allows the power supplied to second input shaft 42 by second prime mover 26 to be extended to first input shaft 40. Input shaft clutch 90 may also be engaged to provide compound gear reduction using one gear ratio from first input shaft 40 and one gear ratio from second input shaft 42. Similarly, second input shaft clutch 92 allows the power supplied to first and second input shafts 40, 42 by first prime mover 22 and/or second prime mover 26 to be extended to rotational output member 74. Accordingly, second prime mover 26 may be operated either alone or in combination with first prime mover 22 to provide power to countershaft 44 through one of gears 68, 70 and 72 or directly to output member 74.

As noted above, if reverse operation of the vehicle is required, ratio gear 68 is fixed for rotation with countershaft 44 by clutch 86 and first and/or second prime movers 22, 26 are operated to drive rotation of countershaft 44 through gears 52, 68 and 94. Alternatively, second prime mover 26 may be operated alone to provide power for reverse operation. In an embodiment, idler gear 94 may be removed to allow gears 52 and 68 to mesh, and second prime mover 26 rotates second input shaft 42 in a direction opposite its normal forward rotating direction.

Second prime mover 26 may also be used to provide the vehicle with an "anti-rollback" feature, i.e., application of torque to hold the vehicle at rest in stopped traffic or on a grade without the use of main clutch assembly 28. In an embodiment, both main clutches C1 and C2 are disengaged, clutch 82 is engaged and second prime mover 26 is operated to apply torque directly to second input shaft 42 to prevent rotation of countershaft 44. Depending on the weight of the vehicle and the grade to be held, full torque slip of second prime mover 26 functioning as an electric motor is typically less than approximately 1-2% of full motor speed. Using an electric motor to provide "anti-rollback" torque is more efficient than using first prime mover 22 functioning as an engine, which would require at least approximately 25% full torque slip through main clutch assembly 28 to hold a grade under similar operating conditions.

During vehicle braking, second prime mover 26 may be selectively driven by countershaft 44, through second input shaft 42, as an electric generator or a hydraulic pump to recharge energy storage device 31. Known as "regenerative braking," this braking complements conventional friction braking to reduce the speed of the vehicle. During regenerative braking, ECU 30 selectively controls operation of first prime mover 22, second prime mover 26 and transmission 24 for appropriate energy recapture. For example, during vehicle braking, clutch 84 may be moved axially to fix either ratio gear 64 or 66 for rotation with countershaft 44. Rotation of countershaft 44 is then used to drive second input shaft 42 and second prime mover 26. When operating as an electric generator, second prime mover 26 recharges a battery or bank of batteries. When operating as a hydraulic pump, second prime mover 26 recharges a hydraulic accumulator. To eliminate drag and increase the regenerative efficiency of regenerative braking, first prime mover 22 may be disengaged from countershaft 44 by disengaging main clutches C1 and C2. However, to maintain vehicle stability during a downhill descent, ECU 30 may be programmed to allow one of first and second main clutches C1 and C2 to remain engaged or partially engaged.

Another feature of the present invention is that first prime mover 22 may be used to drive second prime mover 26 as an electric generator or hydraulic pump to recharge energy storage device 31. While the vehicle is at rest, main clutch C2 may be engaged allowing first prime mover 22 to drive rotation of second input shaft 42 and the input portion of second prime mover 26. Alternatively, input shaft clutch 90 may be selectively actuated to fix first input shaft 40 for rotation with second input shaft 42, as described above. With main clutch C2 disengaged, main clutch C1 is then engaged to drive rotation of first input shaft 40, second input shaft 42 and the input portion of second prime mover 26. Due to the properties of a four quadrant motor drive, energy storage device 31 functioning as a battery, bank of batteries or a capacitor may also be recharged while the vehicle is at cruise and second input shaft 42 is rotating. When second prime mover 26 functions as an electric generator, first prime mover 22 may be used to selectively drive second prime mover 26 to supply electric power for on-board or off-board electrical equipment via the existing drive inverter. Similarly, when second prime mover 26 functions as a hydraulic pump, first prime mover 22 may be used to selectively drive second prime mover 26 to provide fluid power for on-board or off-board hydraulic equipment.

From the above description it should now be apparent that hybrid powertrain system 20 offers a number of efficiency enhancing features. Among other features, the twin clutch transmission provides an improved transition from one gear ratio to another. Another feature is that second prime mover 26 may also be used to supplement the torque provided by first prime mover 22 during vehicle acceleration to improve the fuel economy through downsizing of the engine relative to the size required for engine launch and acceleration alone. Yet another feature is that second prime mover 26 alone may be used to launch the vehicle, thereby reducing the extent to which main clutch assembly 28 is used to improve its operative life. Additionally, second prime mover 26 may be employed as a motor to drive the vehicle in reverse, thereby eliminating the need for reverse idler gearing to reduce transmission complexity.

Another feature is that second prime mover 26 may be operated as a motor to start first prime mover 22 (when first prime mover 22 functions as an engine), thus reducing the mass and space needed for a conventional starter motor. Still another advantage over prior art powertrain systems is the virtual elimination of the undesirable parasitic load on the powertrain resulting from second prime mover 26 drag when the vehicle is cruising under the sustained power of first prime mover 22.

Additionally, when operating as an electric generator or hydraulic pump, second prime mover 26 may be selectively operated to recover electrical or hydraulic energy during vehicle braking, to enhance fuel economy. Another feature is that energy storage device 31 may be recharged while the vehicle is at rest or while the vehicle is moving, by selectively engaging clutches C1, C2 and 90 as required. Still another feature is that second prime mover 26 may be operated as an electric generator or hydraulic pump to power on-board or off-board electric or hydraulic devices, while the vehicle is either at rest or moving.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A transmission and clutch arrangement for a dual prime mover powertrain system, comprising:
   a change-gear transmission having a first input shaft, an output member and a second input shaft;
   a twin clutch that includes a first main clutch configured to selectively transfer power between a first prime mover and the first input shaft and a second main clutch configured to selectively transfer power between the first prime mover and the second input shaft;
   an output clutch operably positioned between the first input shaft and the output member, wherein at least one of the first and second input shafts is configured for connection to a second prime mover, wherein the first input shaft and the output member are generally co-axial; and
   an input shaft clutch positioned between the first input shaft and the second input shaft to selectively fix rotation of the first and second input shafts.

2. The transmission and clutch arrangement of claim 1, wherein the first prime mover is an internal combustion engine and the second prime mover is one of an electric motor and a hydraulic motor.

3. The transmission and clutch arrangement of claim 1, wherein the first input shaft includes at least one first input gear and the second input shaft includes at least one second input gear.

4. The transmission and clutch arrangement of claim 3, wherein the first and second input gears are secured to first and second input shafts, respectively, for rotation therewith.

5. The transmission and clutch arrangement of claim 3, wherein the transmission also includes a countershaft having at least two countershaft gears, and wherein each of the first and second input gears are meshed with a corresponding countershaft gear.

6. The transmission and clutch arrangement of claim 5, wherein the countershaft gears are rotatably supported on the countershaft.

7. The transmission and clutch arrangement of claim 1, wherein the output member selectively transmits torque to a driveshaft while the driveshaft rotates at about the same angular velocity as the output member.

8. The transmission and clutch arrangement of claim 1, wherein the second prime mover selectively provides regenerative braking when the second main clutch is not engaged.

9. The transmission and clutch arrangement of claim 1, wherein the second prime mover selectively transfers a torque to a driveshaft to hold the vehicle at rest on a grade when both the first main clutch and the second main clutch are disengaged.

10. A transmission and clutch arrangement for a dual prime mover powertrain system, comprising:
    a change-gear transmission having a first input shaft, a second input shaft, and an output member, wherein the output member is coupled to a driveshaft for rotation therewith;
    a twin clutch that includes a first main clutch configured to selectively transfer power between a first prime mover and the first input shaft and a second main clutch configured to selectively transfer power between the first prime mover and the second input shaft;
    an output clutch operably positioned between the first input shaft and the output member such that the first input shaft may be coupled for rotation at about the same speed as a driveshaft, wherein at least one of the first and second input shafts is operably connected to a second prime mover, and wherein the first input shaft and the output member are generally co-axial; and
    an input shaft clutch positioned between the first input shaft and the second input shaft to selectively fix rotation of the first and second input shafts.

11. The transmission and clutch arrangement of claim 10, wherein the first input shaft includes at least one first input gear and the second input shaft includes at least one second input gear, the second prime mover selectively transmits a torque to the output member, and wherein at least a portion of the torque is transmitted through both the at least one first input gear and the at least one second input gear.

12. The transmission and clutch arrangement of claim 10, wherein the second prime mover may selectively rotate the output member in a reverse rotational direction and the second prime mover may selectively counter-rotate the output member in an opposite rotational direction without the use of an idler gear.

13. The transmission and clutch arrangement of claim 10, wherein the second prime mover selectively holds the vehicle at rest on a grade when both the first main clutch and the second main clutch are disengaged.

14. A transmission and clutch arrangement for a dual prime mover powertrain system, comprising:
    a change-gear transmission having a first input shaft, a second input shaft, and an output member, wherein the output member is coupled to a driveshaft for rotation therewith;
    a twin clutch that includes a first main clutch configured to selectively transfer torque between a first prime mover and the first input shaft and a second main clutch configured to selectively transfer torque between the first prime mover and the second input shaft; and
    an output clutch operably positioned between the first input shaft and the output member such that the first prime mover and a second prime mover selectively transmit torque to a driveshaft without the transfer of torque through a meshed gear ratio.

15. The transmission and clutch arrangement of claim 14, further comprising an input shaft clutch positioned between the first input shaft and the second input shaft to selectively fix rotation of the first and second input shafts.

16. The transmission and clutch arrangement of claim 15, wherein the at least a portion of the torque is selectively transferred from the second prime mover through both the input clutch and the output clutch.

17. The transmission and clutch arrangement of claim 14, wherein the second prime mover selectively provides regenerative braking when the second main clutch is not engaged.

18. The transmission and clutch arrangement of claim 17, wherein energy is selectively transferred from the second prime mover to an energy storage device to recharge the energy storage device during regenerative braking.

19. A transmission and clutch arrangement for a dual prime mover powertrain system, comprising:
    a change-gear transmission having a first input shaft, an output member and a second input shaft;
    a twin clutch that includes a first main clutch configured to selectively transfer power between a first prime mover and the first input shaft and a second main clutch configured to selectively transfer power between the first prime mover and the second input shaft; and
    an output clutch operably positioned between the first input shaft and the output member, wherein at least one of the first and second input shafts is configured for connection to a second prime mover, wherein the first input shaft and the output member are generally co-axial, wherein the first input shaft includes at least one first input gear and the second input shaft includes at least one second input gear, and wherein the transmission also includes a countershaft having at least two countershaft gears, and wherein each of the first and second input gears are meshed with a corresponding countershaft gear.

20. The arrangement of claim 19, wherein the first and second input gears are secured to first and second input shafts, respectively, for rotation therewith.

21. The arrangement of claim 19, wherein the first prime mover is an internal combustion engine and the second prime mover is one of an electric motor and a hydraulic motor.

22. The arrangement of claim 19, wherein the output member selectively transmits torque to a driveshaft while the driveshaft rotates at about the same angular velocity as the output member.

23. The arrangement of claim 19, wherein the second prime mover selectively transfers a torque to a driveshaft to hold the vehicle at rest on a grade when both the first main clutch and the second main clutch are disengaged.

24. The arrangement of claim 19, wherein the second prime mover selectively transfers a torque to a driveshaft to hold the vehicle at rest on a grade when both the first main clutch and the second main clutch are disengaged.

25. A transmission and clutch arrangement for a dual prime mover powertrain system, comprising:

a change-gear transmission having a first input shaft, an output member and a second input shaft;

a twin clutch that includes a first main clutch configured to selectively transfer power between a first prime mover and the first input shaft and a second main clutch configured to selectively transfer power between the first prime mover and the second input shaft; and an output clutch operably positioned between the first input shaft and the output member, wherein at least one of the first and second input shafts is configured for connection to a second prime mover, wherein the first input shaft and the output member are generally co-axial, and wherein the second prime mover selectively transfers a torque to a driveshaft to hold the vehicle at rest on a grade when both the first main clutch and the second main clutch are disengaged.

26. The arrangement of claim 25, wherein the output member selectively transmits torque to a driveshaft while the driveshaft rotates at about the same angular velocity as the output member.

27. The arrangement of claim 25, wherein the second prime mover selectively transfers a torque to a driveshaft to hold the vehicle at rest on a grade when both the first main clutch and the second main clutch are disengaged.

28. A transmission and clutch arrangement for a dual prime mover powertrain system, comprising:

a change-gear transmission having a first input shaft, a second input shaft, and an output member, wherein the output member is coupled to a driveshaft for rotation therewith;

a twin clutch that includes a first main clutch configured to selectively transfer power between a first prime mover and the first input shaft and a second main clutch configured to selectively transfer power between the first prime mover and the second input shaft; and an output clutch operably positioned between the first input shaft and the output member such that the first input shaft may be coupled for rotation at about the same speed as a driveshaft, wherein at least one of the first and second input shafts is operably connected to a second prime mover, and wherein the first input shaft and the output member are generally co-axial, wherein the second prime mover may selectively rotate the output member in a reverse rotational direction and the second prime mover may selectively counter-rotate the output member in an opposite rotational direction without the use of an idler gear.

29. The arrangement of claim 28, further comprising an input shaft clutch positioned between the first input shaft and the second input shaft to selectively fix rotation of the first and second input shafts.

30. The arrangement of claim 28, wherein the second prime mover selectively holds the vehicle at rest on a grade when both the first main clutch and the second main clutch are disengaged.

31. A transmission and clutch arrangement for a dual prime mover powertrain system, comprising:

a change-gear transmission having a first input shaft, a second input shaft, and an output member, wherein the output member is coupled to a driveshaft for rotation therewith;

a twin clutch that includes a first main clutch configured to selectively transfer power between a first prime mover and the first input shaft and a second main clutch configured to selectively transfer power between the first prime mover and the second input shaft; and an output clutch operably positioned between the first input shaft and the output member such that the first input shaft may be coupled for rotation at about the same speed as a driveshaft, wherein at least one of the first and second input shafts is operably connected to a second prime mover, and wherein the first input shaft and the output member are generally co-axial, wherein the second prime mover selectively holds the vehicle at rest on a grade when both the first main clutch and the second main clutch are disengaged.

32. The arrangement of claim 31, farther comprising an input shaft clutch positioned between the first input shaft and the second input shaft to selectively fix rotation of the first and second input shafts.

* * * * *